March 18, 1958  E. S. RICHES  2,827,553
PHOTOGRAPHIC LIGHTING APPARATUS
Filed Nov. 7, 1955  2 Sheets-Sheet 1

INVENTOR.
EDWIN S. RICHES
BY
Buckhorn and Cheatham
ATTORNEYS

March 18, 1958 E. S. RICHES 2,827,553
PHOTOGRAPHIC LIGHTING APPARATUS
Filed Nov. 7, 1955 2 Sheets-Sheet 2

INVENTOR.
EDWIN S. RICHES
BY
Buckhorn and Cheatham
ATTORNEYS

United States Patent Office 2,827,553
Patented Mar. 18, 1958

2,827,553

PHOTOGRAPHIC LIGHTING APPARATUS

Edwin S. Riches, South Laguna, Calif.

Application November 7, 1955, Serial No. 545,286

7 Claims. (Cl. 240—1.3)

This invention relates to a photographic lighting apparatus and more particularly to simple portable apparatus for directing light on a subject to be photographed in a manner enabling the light intensity and other lighting effects to be varied over wide ranges.

The lighting apparatus of the present invention is particularly suitable for portrait work but may be employed for other types of photography. It includes a screen having a reflecting surface for reflecting light from a light source on the subject being photographed, the screen being supported between the light source and the camera in a position screening the camera from the light source. The light source is carried by the support for the screen so that its position can be adjusted to direct light onto the reflecting surface at various angles and from various distances. The light source is preferably detachably connected to the supporting structure of the screen so that various types of light sources may be employed, but otherwise the entire lighting apparatus of the present invention is embodied in a simple unitary structure which may be folded so as to form a compact unit which is of light weight so as to be readily portable.

It is therefore an object of the present invention to provide improved apparatus for directing light upon a subject to be photographed while at the same time shielding the camera from the source of light.

Another object of the invention is to provide a photographer's lighting apparatus including a screen having a reflecting surface in which apparatus a light source adjustably carried by the support for such screen may be directed toward the screen from various angles and from various distances in order to vary the lighting effect upon the subject being photographed.

A further object of the invention is to provide improved portable lighting apparatus for photography which may be employed to give a variety of lighting effects by varying the direction and intensity of light from a reflecting screen forming part of the apparatus and which apparatus may be folded into a compact unit and of light weight so as to render the apparatus readily portable.

Other objects and advantages of the invention will appear in the following description of the preferred embodiment thereof given in connection with the attached drawings of which:

Figure 1:
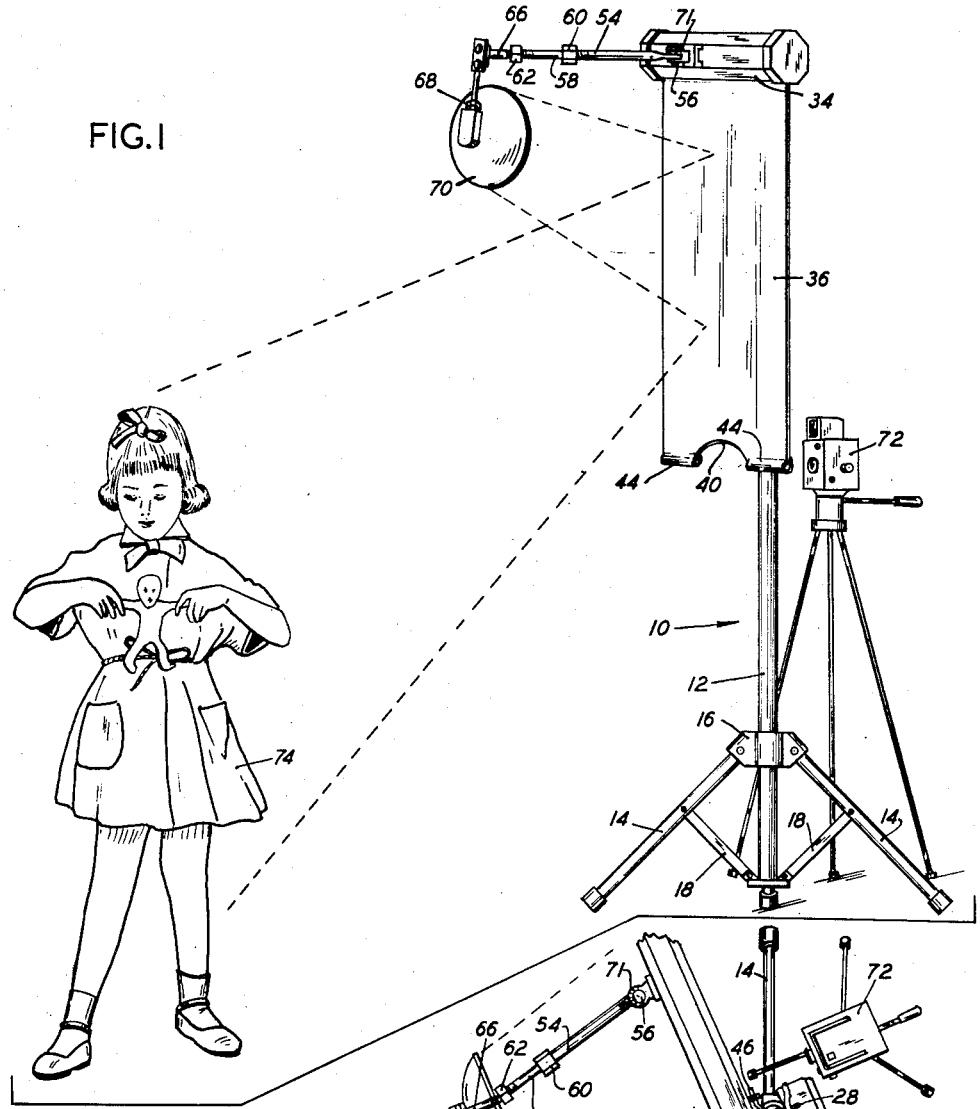
Fig. 1 is a perspective view of the apparatus of the present invention also showing in association therewith a camera and also a subject to be photographed.

Referring to the drawings, the photographic lighting apparatus of the present invention includes a folding stand 10 which is adjustable in height. The stand 10 includes a tubular body member 12 and folding legs 14 pivoted at their upper ends to a member 16 vertically slidable upon the body member of the stand 10 and also pivoted intermediate their ends to the ends of links 18 having their other ends pivoted to the base of the body member 12. The leg structure just described is of a conventional type enabling the legs to be folded flat against the body portion 12 of the stand by sliding the member 16 vertically upwardly along the body member. The body member 12 receives a tubular intermediate extension member 20 in telescoping relationship, the extension member 20 being held in adjusted position by means of a locking screw 22 in the upper end of the body member 12. The tubular extension member 20 in turn receives a top extension member 24 in telescoping relationship, the member 24 being held in adjusted position by means of a locking screw 26 in the upper end of the tubular intermediate extension member 20.

Figure 2:
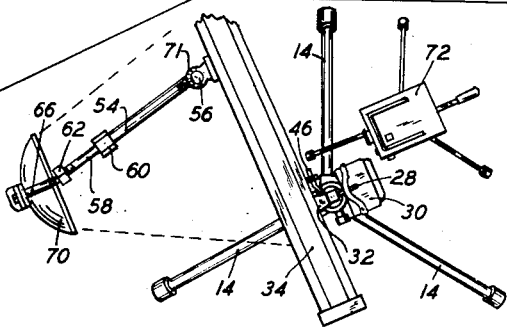
Fig. 2 is a partial plan view of the apparatus of Fig. 1 also showing the camera.
Figure 3:
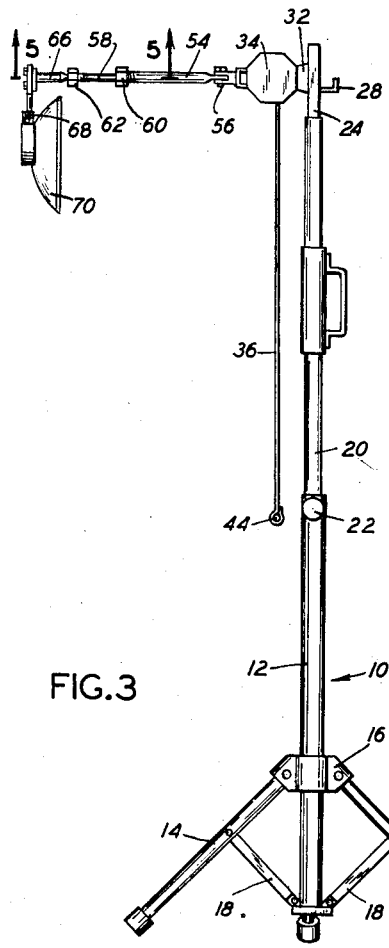
Fig. 3 is a side elevation of the apparatus of the present invention.
Figure 4:
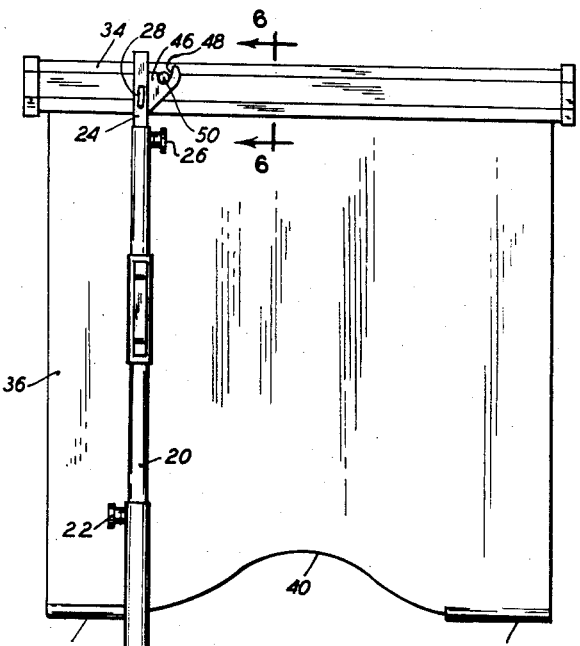
Fig. 4 is a rear elevation of such apparatus.
Figure 6:
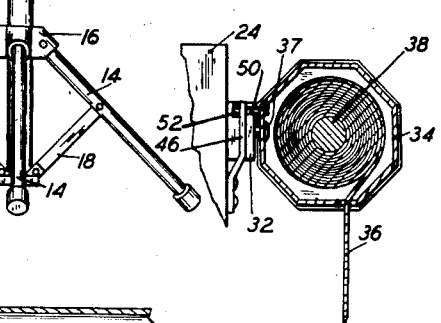
Fig. 6 is a fragmentary vertical section on an enlarged scale taken on the line 6—6 of Fig. 4.

The top extension member 24 preferably carries a hook 28 near its top end, which may be employed, for example, for holding any desired supplemental equipment such as a power pack 30 (Fig. 2) for a gaseous discharge tube type of flash lamp. The top extension member 24 also carries a projection 32 (Fig. 3) to which the casing 34 of a reflecting screen 36 is pivoted by a pivot 37 (Fig. 6). As shown in the various figures, the casing 34 may be of any suitable or conventional type containing therein a spring actuated roller 38 (Fig. 6), which may, for example, be of the windowshade roller type, the roller 38 having wound thereon the upper portion of the screen 36. It will be understood that the screen may be unrolled from the roller 38 so as to be partly withdrawn from the casing 34 and rerolled back into the casing in the same manner as a windowshade. As shown most clearly in Fig. 4, the bottom edge of the screen 36 preferably has a notch 40 extending several inches upwardly into the central portion of the lower edge of the screen, the notch being of substantial width. The purpose of the notch will be discussed below and in order to prevent the screen 36 from being completely withdrawn into the casing 34, the lower edges of the screen at the sides thereof are provided with short thickened portion 44 which may be of the conventional type employed in windowshades, for example, rods inserted in a hem.

The pivot 37 securing the casing 34 of the screen to the projection 32 on the top extension member 24 of the stand 10 is positioned near to but spaced from one end of the casing so that the notch 40 in the screen is spaced laterally from the body portion 12 of the stand 10 when the screen is in the position shown in the drawings. The top extension member 24 of the stand also has hook member 46 projecting therefrom at right angles to the pivot 32 for the casing and such hook member provides a notch 48 in its upper edge for the reception of a stud 50 which projects from the casing 34, the stud being parallel to and spaced from the pivot 37. The pivotal connection afforded by the pivot 37 is sufficiently loose that the casing 34 can be rotated upwardly from a position in which the stud 50 is adjacent the side of the top extension member 24 to a position in which the stud 50 is engaged in the notch 48. The stud 50 has an enlarged head 52 which prevents the stud from being withdrawn laterally from the hook member but upon moving the free end of the casing 12 in an upward direction and then laterally the stud 50 can be disengaged from the notch 48 and the casing then rotated down into parallelism with the body portion 12 of the stand 10.

Figure 5:
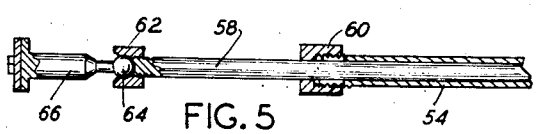
Fig. 5 is a fragmentary horizontal section on an enlarged scale taken approximately on the line 5—5 of Fig. 3.

A telescoping light supporting arm including a tubular body member 54 has one end of the body member pivotally connected at 56 to the side of the casing 34 which is opposite the pivot 37. The pivotal connection for the body member 54 is preferably centrally disposed along the length of the casing 34. The body portion 54 of the light supporting arm receives an extension member 58 in telescoping relationship and is held in adjusted position with respect to the body member 54 by means of a clamping nut 60 (Fig. 5) threaded upon the screw threaded conical and slotted end of the body member 54. The free end of the extension member 58 terminates in a threaded portion having a cap nut 62 screw threaded thereon, the nut being provided with a socket for the reception of a ball 64 on the end of a light supporting member 66 to which one end of any suitable type of quick detachable light connection 68 may be secured. Suitable wiring (not shown) may extend between the power pack 30 and the light 70. The light supporting arm may be adjusted to any angle through a range of approximately 180° with respect to the casing 34 and angle indicating graduations 71 (Fig. 2) may be placed adjacent the pivoted end of the arm for the convenience of the user of the apparatus.

The manner of using the apparatus thus far described in conjunction with a camera 72 and a subject 74 to be photographed is most clearly shown in Fig. 1. The stand 10 is set up adjacent the camera and positioned such that screen 36 will be above the camera so as to have its notch 40 between the camera and the subject to be photograhped. To set up the screen, the legs 14 are first unfolded and the stand set thereon. The casing for the screen is positioned as shown in the various figures and the screen pulled out of the casing 34 so that it occupies the position shown in Fig. 1 with the notch 40 positioned so that the object can be viewed by the camera lens. In this position the camera lens is shielded from the light 70 by the screen including the portions of the screen on each side of the notch 40. A reflex type of camera 72 is shown mounted upon a tripod but any suitable type camera can be employed. If not already attached, the light 70 is attached to the end of the light supporting arm 54 and the length of this arm may be adjusted as well as its angle with respect to the casing 34, such angle being readily ascertained from the graduations 71. The screen may have any suitable type of reflecting surface and preferably has a diffusing surface rather than a mirror surface. By adjusting the angle which the light supporting arm makes with the casing 34, i. e., with the surface of the screen 36 and also adjusting the length of this arm as well as the angle which the light 70 makes with the arm, the type of light reflected upon the subject can be adjusted from an intense to a very soft light. In each case the light comes from a position above the camera and a large number of lighting effect, either with or without additional light sources, can be obtained. It will be apparent that the light 70 may be of any suitable type such as one employing flash lamps of either the single use type or the multiple use gaseous discharge type. Any suitable flood or other types of photographic lights may also be employed for the light 70. It will also be apparent that various size screens may be employed, screens of the order of thirty to thirty-six inches being particularly suitable.

It will also be apparent that the apparatus of the present invention may be folded into a compact unit for transportation. That is to say, the screen 36 may be rolled into the casing 34 and the casing rotated down until it is parallel with the body portion 12 of the stand. Also, the light supporting arm can be folded against the casing 34 and telescoped so as to not extend beyond the end of the casing. If the light 70 is not removed it can occupy a position at the end of the casing 34. The legs 14 of the stand can also be folded so as to be parallel to the body portion 12 thereof and it will be found that the handle 28 is then substantially at the balance of the folded structures so that such handle is convenient for carrying the folded structure.

I claim:

1. Photographic lighting apparatus comprising a stand having a single screen supporting column of adjustable height, an elongated screen carrying member secured adjacent one of its ends to the upper end of the said column and extending laterally therefrom, a reflecting screen having a plane reflecting surface depending from and supported by said screen carrying member and having its central portion displaced laterally from said supporting column, a light supporting arm pivoted to said screen carrying member intermediate the ends of said member for pivotal movement of an extending portion of said arm about a vertical axis, and means for securing a photographic light to said extending portion of said arm so as to direct said light toward said screen.

2. Photographic lighting apparatus comprising a stand having a single screen supporting column of adjustable height, an elongated screen carrying member secured adjacent one end thereof to the upper end of the said column and extending laterally from said column, a reflecting screen having a plane reflecting surface depending from and supported by said screen carrying member and having its central portion displaced laterally from said supporting column, a light supporting arm having one end pivoted to said screen carrying member adjacent the center of said member for pivotal movement of said arm about a vertical axis, and means for securing a photographic light to the other end of said arm so as to direct said light toward said screen.

3. Photographic lighting apparatus comprising a folding stand having a single screen supporting column of adjustable height, an elongated screen carrying member pivoted adjacent one end thereof to the upper end of the said column and extending laterally from said column, a reflecting screen having a plane reflecting surface depending from and supported by said screen carrying member and having its central portion displaced laterally from said supporting column, a light supporting arm pivoted at one of its ends to said screen carrying member intermediate the ends of said member for pivotal movement of said arm about a vertical axis, and means for adjustably securing a photographic light to said other portion of said arm so as to direct said light toward said screen, said screen having an upwardly extending notch in its lower edge.

4. Photographic lighting apparatus comprising a folding stand including a plurality of telescoping members providing a single supporting column of adjustable height, an elongated screen casing having a longitudinal slot therein and secured to the upper end of said column adjacent one end of said casing, means for holding said casing in a horizontal position extending laterally of said column with said slot in the lower portion of said casing, a reflecting screen normally housed in said casing, said screen being supported in said casing for partial withdrawal through said slot, a light supporting arm pivoted to said casing intermediate the ends of said casing and having an extending portion movable horizontally above said pivot, said extending portion being of adjustable length and having means for adjustably supporting a photographic light.

5. Photographic lighting apparatus comprising a folding stand including a plurality of telescoping members providing a single supporting column of adjustable height, an elongated screen casing having a longitudinal slot therein and pivotally secured to the side of the upper end of said column adjacent one end of said casing, means for holding said casing in a horizontal position extending laterally of said column with said slot in the lower portion of said casing, a reflecting screen normally housed in said casing, said screen being supported in said casing for partial withdrawal through said slot, a light supporting arm having one end pivoted to said casing intermediate the ends of said casing and having a free end movable horizontally above said pivot, said arm being of adjustable length and having means at said free end for detachably and adjustably supporting a photographic light.

6. Photographic lighting apparatus comprising a folding stand including a plurality of telescoping members providing a single supporting column of adjustable height, an elongated screen casing having a longitudinal slot therein and secured to the upper end of said column adjacent one end of said casing, means for holding said casing in a horizontal position extending laterally of said column with said slot in the lower portion of said casing, a reflecting screen normally housed in said casing, said screen being supported in said casing for partial withdrawal through said slot, a light supporting arm having one end pivoted to said casing intermediate the ends of said casing and having a free end movable horizontally above said pivot, said arm being of adjustable length and having means at said free end for detachably and adjustably supporting a photographic light, said screen having a notch extending upwardly from its lower edge.

7. Photographic lighting apparatus comprising a folding stand including folding legs and a plurality of telescoping members providing a single supporting column of adjustable height, an elongated screen casing having a longitudinal slot therein and pivotally secured to one side of the upper end of said column adjacent one end of said casing for pivotal movement from a position in which said casing is parallel to said column to a position in which said casing extends laterally of said column, means for holding said casing in said position extending laterally of said column and with said slot in the lower portion of said casing, a reflecting screen normally housed in said casing and retractably supported therein for partial withdrawal through said slot, a light supporting arm of adjustable length having one end pivoted to said casing adjacent the center of said casing and having an extending portion providing a free end movable about said pivot in a horizontal plane, said arm having means at said free end for detachably and adjustably supporting a photographic light so that said light can be directed toward said screen, said screen having a notch in its lower edge so that a camera positioned on the other side of said screen from an object being photographed may view said object through said notch while being screened from said light by said screen.

References Cited in the file of this patent

UNITED STATES PATENTS

| | | |
|---|---|---|
| 1,038,135 | Herricht | Sept. 10, 1912 |
| 1,370,842 | Reeves | Mar. 8, 1921 |
| 1,409,574 | Rasmussen | Mar. 14, 1922 |
| 1,786,787 | Steinmeyer | Dec. 30, 1930 |
| 1,834,428 | Seitz | Dec. 1, 1931 |
| 2,290,793 | Alderman | July 21, 1942 |
| 2,750,489 | Gibson | June 12, 1956 |

FOREIGN PATENTS

| | | |
|---|---|---|
| 369,728 | Great Britain | Mar. 31, 1932 |
| 584,551 | Great Britain | Jan. 17, 1947 |